Feb. 18, 1958   J. H. GARDNER ET AL   2,824,119
POLYMERIC OXIDATION PRODUCT OF AN OLEFIN AND AN
ARALKANE AND PROCESS
Filed Sept. 13, 1955
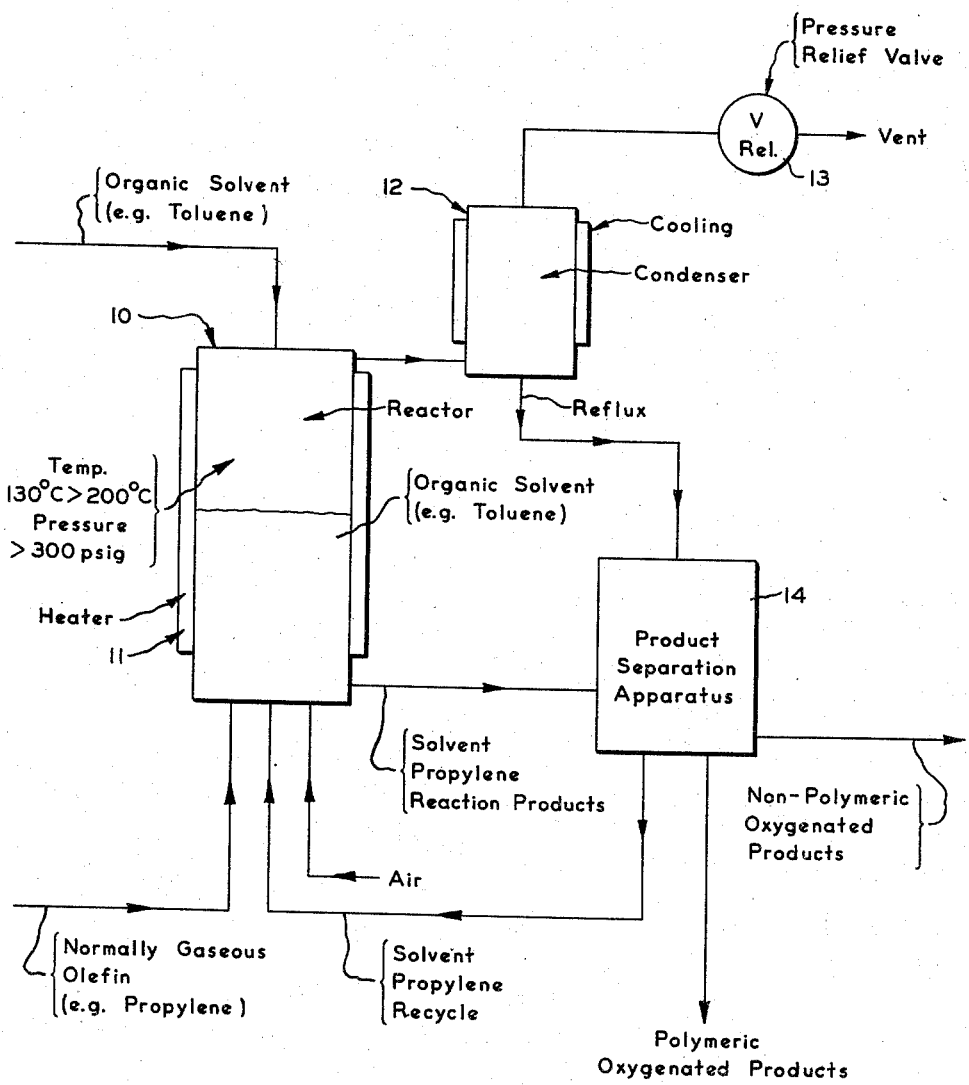
INVENTORS
James H. Gardner
BY Nat C. Robertson
Charles I. Tewksbury
Oliver W. Hayes
ATTORNEY 
United States Patent Office 2,824,119
Patented Feb. 18, 1958

2,824,119

POLYMERIC OXIDATION PRODUCT OF AN OLEFIN AND AN ARALKANE AND PROCESS

James H. Gardner, Weston, Nat C. Robertson, Wellesley, and Charles I. Tewksbury, Chestnut Hill, Mass., assignors, by mesne assignments, to Escambia Chemical Corporation, Pace, Fla., a corporation of Delaware Application September 13, 1955, Serial No. 534,025

4 Claims. (Cl. 260—469)

This invention relates to the production of chemicals and in particular to the conversion of olefinic compounds to polymeric materials. This application is, in part, a continuation of our copending application Serial No. 443,674, filed July 15, 1954, now abandoned.

A principal object of the present invention is to provide a method for producing good yields of oxygenated polymeric materials by the oxidation of a normally gaseous olefin in a liquid alkyl aromatic solvent.

Another object of the invention is to provide a method of the above type wherein the normally gaseous olefin is propylene.

Still another object of the invention is to produce novel polymeric materials.

Other objects of the invention will in part be obvious and will in part appear hereinafter.

The invention accordingly comprises the process involving the several steps and the relation and the order of one or more of such steps with respect to each of the others, and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing.

The present invention is directed to the manufacture of polymeric materials by the oxidation of a normally gaseous olefin. A preferred specific embodiment of the present invention will be initially described in connection with the oxidative polymerization of propylene without attempting to limit the scope thereof. The polymeric materials are preferably obtained by oxidizing propylene in an organic solvent at a relatively high pressure and at elevated temperatures on the order of 130° C. and above. The organic solvent is preferably a liquid alkyl aromatic compound and more particularly an alkyl benzene. The preferred organic solvent is toluene. This oxidative polymerization is preferably achieved by introducing or passing an elemental-oxygen-containing gas into a preferred organic solvent containing a high concentration of propylene. This high propylene concentration is preferably achieved by adjusting the feed rate of propylene so as to maintain the mole percent of propylene introduced into the solvent above about 15 percent of the preferred solvent.

The raw polymer, as obtained from the above reaction, comprises compounds containing from 2 to 6 or more propylene residues per molecule. These molecules may contain double bonds, ester linkages, carboxy groups, hydroxy groups (primary and secondary), carbonyl groups and alkoxy groups. The polymer contains, on the average, at least one oxygenated functional group per molecule, and an appreciable proportion of the molecules present may be difunctional. The quantity of oxygen present in the polymer lies between about 5 percent and 20 percent. An appreciable proportion of the molecules present in the polymer also contains at least one double bond, thus accounting for its moderate unsaturation.

The raw polymer is virtually insoluble in water and has a very characterisic, but not unpleasant, odor. The average molecular weight of the raw polymer has been found to be above about 100 and generally on the order of about 185. It has also been ascertained that this raw polymer has a boiling point range of from about 150° C. to above about 225° C. When fractionated, the lighter cuts are mobile, the intermediate cuts fairly mobile, and the heavy cuts viscous. The residue is semi-solid.

The nature of the polymer not only depends upon the olefin employed but also upon the character of the preferred organic solvent used in the oxidation reaction. Thus it has been found that, when an alkyl benzene such as toluene is employed, the raw polymeric material obtained is comprised of above about 25 percent by weight of phenyl groups. The majority of the molecules present in the polymer contain at least one phenyl group and at least one oxygenated functional group.

The raw polymeric material may be subjected to a wide range of subsequent modification treatments with or without preliminary partial separation of its constituents. Among these further modification treatments are reduction or hydrogenation, oxidation, hydrogenolysis, acetylation or combinations of these reactions. For example, when alcohols are the desired end products, the polymer is subjected to a reduction step. This may be, for example, a hydrogenation in the presence of copper chromite or a Raney nickel catalyst or may be a reduction with a metallic reducing agent such as sodium. Copper chromite is preferred as a hydrogenation catalyst as it achieves a more complete reduction of the reducible groups of the polymer. When acids are the desired end product, the raw polymer may be directly oxidized. In some cases, it may even be desirable that the carbon-to-carbon double bonds present in the raw polymer be saturated with hydrogen prior to any extensive modification of the polymer.

The polymers produced by the present invention have considerable utility. For instance, they may be used as synthetic lubricants, viscosity index improvers, pour point depressants for petroleum lubricants and plasticizers. The derivatives of the polymers, and particularly their alcohol and acid derivatives, also find utility. The polymeric acids and alcohols provide valuable chemical intermediates for the manufacture of resins such as polyesters and the like. Equally, these materials may be converted to synthetic detergents, emulsifiers, melting agents and surface active agents in general.

Specific detailed methods of practicing the present invention are set forth in the following non-limiting example. In this example, the reference numerals indicate the appropriate sections of the flow sheet illustrated in the drawing.

*Example I*

The organic solvent, 1500 mls. of toluene, 102 cc. of water containing a phosphate buffer at pH 6.5, and 1.4 grams of manganese propionate catalyst, were charged to a high pressure reactor 10. The reactor was put under about 300 p. s. i. g. of nitrogen and brought up to the operating temperature within the range of 210°–230° C. by means of a heater indicated at 11. The pressure relief valve 13 was then adjusted to maintain a pressure of about 750–800 p. s. i. g. The reactor was charged with 496 grams of propylene and a steady rate of air feed of between 4 to 5 standard cubic feet per hour was commenced. Propylene was fed to the reactor at a rate to make up for the loss of propylene in the purge gas and for that which reacted. During a run of about 5 hours duration, 588 grams of propylene were fed to the reactor. The feed rate of propylene was adjusted so as to maintain the mole percent of propylene introduced into the toluene above about 30 percent of the toluene. After termination of the run, the toluene and water layers were separated. The toluene layer was washed exhaustively with water, the washings being added to the original aqueous phase. The phases were then distilled separately to recover volatiles and, in the case of the toluene solution, to recover the toluene solvent from the polymer. The above run produced the following materials, the yields of which are indicated as grams of product per 100 grams of propylene consumed:

|  | Grams |
|---|---|
| Propylene oxide | 12.8 |
| Propylene glycol | 6.2 |
| Polymeric oxygenated materials | 116.6 |
| Carbon oxides | 27.6 |
| Other material | 17.2 |

The polymeric oxygenated material obtained in the above run was found to have an average molecular weight on the order of about 184. On analysis, it was found that the polymeric material contained about 75.1% carbon, 8.2% hydrogen, and 16.7% oxygen, the oxygen being primarily present in carbonyl, ester, carboxy and hydroxy groups. Phenyl groups derived from the toluene solvent constituted on the order of about 43 percent of the weight of the polymeric oxygenated material.

Referring now to the drawing, there is illustrated a flow sheet which embodies one continuous method of practicing the present invention. In the flow sheet, there is shown a reactor 10 charged with a preferred organic solvent (e. g., toluene) and an initial quantity of a normally gaseous olefin (e. g., propylene). The reactor 10 is maintained at a pressure above about 300 p. s. i. g. and at a temperature above about 130° C. by means of a heater indicated at 11. The preferred quantities of air, propylene and solvent (e. g., toluene) are fed to the reactor 10. Propylene and other materials are continuously refluxed by means of a condenser 12 to product separation apparatus 14. The reaction products, along with some solvent and unreacted propylene, are also withdrawn from the reactor 10 to the product separation apparatus 14. The various products of the reaction mixture are isolated in the product separation apparatus 14. Solvent and unreacted propylene are recycled back to the bottom of the reactor 10.

While only one example of the present invention has been discussed above, it should be pointed out that numerous modifications may be made without departing from the scope of the invention. For instance, in the above example, the concentration of the propylene was rather high during the oxidation. While not essential to the operation of the process, this aspect of the invention has been found to increase greatly the amount of oxygenated polymeric material produced per 100 grams of propylene consumed. In this connection, it has been found that best results are achieved when the mole percent of the propylene introduced into the solvent is maintained greater than about 15 percent of the solvent. This concentration is preferably greater than about 20 percent and, in the above specific example, was actually maintained greater than 30 percent. Equally, solvents from the class of liquid alkyl aromatic compounds, i. e., liquid aromatic compounds containing an alkyl group as a side chain, and more particularly alkyl benzenes can also be employed in the oxidative polymerization in place of the preferred toluene. Alkyl naphthalenes, such as ethyl naphthalene and 1,4 dimethyl naphthalene, and alkyl benzenes, such as ethyl benzene, xylene, isopropyl benzene and the like, may also be employed as solvents. The organic solvent employed, however, must be capable of being incorporated in an appreciable amount into the polymer. Admixtures of the preferred organic solvents can also be used, e. g., toluene and ethyl benzene.

The manganese propionate (of about 0.1% concentration) is a well-known oxidation catalyst. Other manganese salts or salts or oxides of metals of variable valence are equally effective. Similarly, while the use of a phosphate buffer solution is quite effective, numerous other well-known buffer solutions may be employed or eliminated entirely.

The range of operating pressures and operating temperatures is quite broad and can be varied within considerable limits. With regard to the pressure, it should be pointed out that it is preferably maintained above 300 p. s. i., but that considerably higher pressures may be utilized where design considerations indicate the desirability of such higher pressures. The temperature within the reactor may be varied between about 130° C. and 250° C. or higher, the temperature in all cases remaining below the critical temperature of the solvent.

The specific procedure described for the oxidative polymerization of propylene can be applied to other normally gaseous olefins such as the butylenes and the amylenes.

Since certain changes may be made in the above process and product without departing from the scope of the invention, it is intended that all matter contained in the above description, or shown in the accompanying drawing, shall be interpreted as illustrative and not in a limiting sense.

What is claimed is:

1. The process of producing polymeric material with an average molecular weight above 100 which comprises the steps of introducing a normally gaseous olefin into a liquid alkyl aromatic solvent, passing an elemental-oxygen-containing gas into said solvent while the solvent is held under a pressure above 300 p. s. i. to oxidize and polymerize said olefin to polymeric material, maintaining said solvent at a temperature above about 130° C. while said olefin and elemental-oxygen-containing gas are introduced therein, separating from the solvent a polymeric material containing above about 25 percent by weight of phenyl groups derived from the solvent and oxygenated functional groups selected from the class consisting of hydroxy, carbonyl, carboxy, alkoxy, and ester groups.

2. The process of claim 1 wherein the liquid alkyl aromatic solvent is an alkyl benzene.

3. The process of producing polymeric materials with an average molecular weight of above 100 which comprises the steps of introducing propylene into toluene, passing an elemental-oxygen-containing gas into said toluene while the toluene is held under a pressure above 300 p. s. i. to oxidize and polymerize said propylene to polymeric material, maintaining said toluene at a temperature above about 130° C. while said propylene and elemental-oxygen-containing gas are introduced therein and separating from the toluene a polymeric material containing above about 25 percent by weight of phenyl groups derived from the toluene and oxygenated functional groups selected from the class consisting of hydroxy, carbonyl, carboxy, alkoxy and ester groups.

4. A polymeric material having an average molecular weight in excess of 100 resulting from the reaction between an elemental-oxygen-containing gas, propylene and toluene at a pressure above 300 p. s. i. and at a temperature above about 130° C., said polymeric material being comprised of above about 25 percent by weight of phenyl groups derived from the toluene and oxygenated functional groups selected from the class consisting of hydroxy, carbonyl, carboxy, alkoxy and ester groups.

References Cited in the file of this patent

UNITED STATES PATENTS

| 1,516,720 | Ellis | Nov. 25, 1924 |
| 1,517,968 | Ellis | Dec. 2, 1924 |
| 2,475,605 | Prutton et al. | July 12, 1949 |